(No Model.)

M. MURRAY.
HOLDER FOR LIDS OF VESSELS.

No. 498,020. Patented May 23, 1893.

WITNESSES:
A. O. Babendreier
Chas. B. Mann Jr

INVENTOR:
Michael Murray
By Chas B Mann
atty

THE NORRIS PETERS CO., PHOTO-LITHO., WASHINGTON, D. C.

UNITED STATES PATENT OFFICE.

MICHAEL MURRAY, OF BALTIMORE, MARYLAND.

HOLDER FOR LIDS OF VESSELS.

SPECIFICATION forming part of Letters Patent No. 498,020, dated May 23, 1893.

Application filed February 6, 1893. Serial No. 461,128. (No model.)

*To all whom it may concern:*

Be it known that I, MICHAEL MURRAY, a citizen of the United States, residing at Baltimore, in the State of Maryland, have invented certain new and useful Improvements in Holders for Lids of Vessels, of which the following is a specification.

My invention relates to a lid-holder for buckets, pots, kettles and like utensils.

The object of the invention is to provide the lid or cover of vessels, of the class indicated, with a device adapted to clip on the rim of the vessels and thereby hold the lid when it is temporarily lifted from the top of the vessel.

The invention is illustrated in the accompanying drawings in which—

Figure 1:
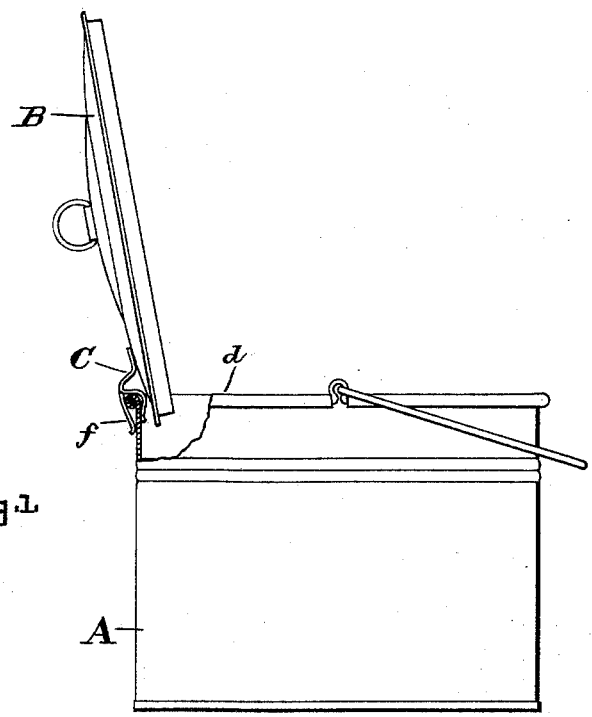
Figure 3:
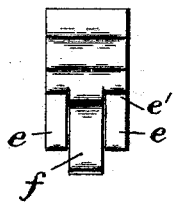
Figure 2:
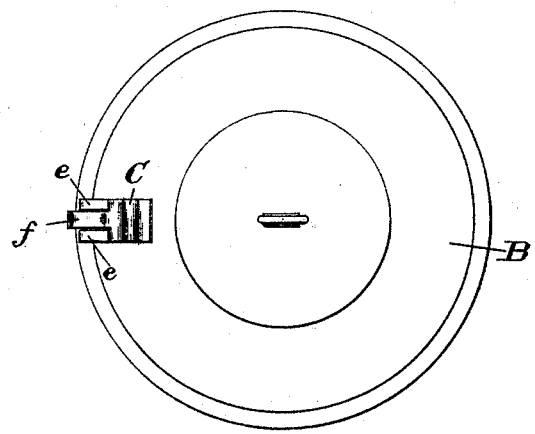
Figure 4:
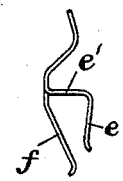

Figure 1 is a view of a vessel and its lid held in position by the lid holder. Fig. 2 is a top view of the lid provided with the lid-holder. Figs. 3 and 4 are views of the lid-holder separate from the cover.

The letter A designates a circular vessel of any kind, and B, its lid or cover, of ordinary construction. The lid near its rim has attached a holder device, C, which has prongs adapted to set astride of the rim of the vessel and support the lid in an upright position, as shown in Fig. 1.

The lid-holder, C, in the present example, has three prongs, two of which, e, are to take on one side of the rim, d, of the vessel while the other one, f, takes on the opposite side of said rim. The prong (or prongs if more than one) which takes on the inner side of the vessel's rim, has at its base a shoulder or offset, e', which, when the cover is held, rests on top of the vessel's rim, and the lowermost part of the rim of the cover is brought inside of the circle which is formed by the vessel's top-rim; thus if any moisture, such as the condensation formed by steam, be on the inner surface of the cover, such moisture will drip into the vessel and not outside of it. In the case of stewing pans, or boiling kettles, on a cook stove, this affords an obvious advantage.

The lid-holder, C, may be a separate piece of metal, stamped up or cast, and suitably secured to the lid; or, it is evident, it may in the case of cast-iron lids, be integral therewith. While in the present instance three prongs are shown to set astride, it is obvious the device may have this construction varied, so as to comprise two, or more than three, and arranged any way to coact with the vessel and lid.

By means of this holder the lid of a vessel may be removed and then supported temporarily on the rim of the vessel, in an upright position, where it is free from all liability of becoming soiled, and thus as the lid has been kept from the dirt, when it is again placed as a cover on the vessel there will be no possibility of any dirt dropping into the vessel.

Having described my invention, I claim—

1. A lid for buckets, pots, kettles and like vessels, having a holder consisting of prongs, adapted to set astride of the rim of the vessel and support the lid in an upright position.

2. The combination of a vessel such as buckets, pots, and kettles, having a top-rim; a lid or cover for the vessel, and a lid-holder having prongs which co-act with the said top-rim and also the rim of the lid, and support the said lid in an upright position.

In testimony whereof I affix my signature in the presence of two witnesses.

MICHAEL MURRAY.

Witnesses:
ALVAN MACAULEY,
CHAS. B. MANN, Jr.